United States Patent
Kondo et al.

(10) Patent No.: US 8,726,193 B2
(45) Date of Patent: May 13, 2014

(54) APPARATUS, METHOD, AND PROGRAM FOR DISPLAY CONTROL

(75) Inventors: Hirohito Kondo, Kanagawa (JP); Akari Hoshi, Tokyo (JP); Satoshi Akagawa, Tokyo (JP); Tomohiro Tsuyuhara, Kanagawa (JP); Zhezhu Jin, Saitama (JP)

(73) Assignee: Sony Corporation, Tokyo (JP)

( * ) Notice: Subject to any disclaimer, the term of this patent is extended or adjusted under 35 U.S.C. 154(b) by 1310 days.

(21) Appl. No.: 11/958,748

(22) Filed: Dec. 18, 2007

(65) Prior Publication Data

US 2008/0178124 A1   Jul. 24, 2008

(30) Foreign Application Priority Data

Jan. 23, 2007  (JP) ................................ 2007-012899

(51) Int. Cl.
- *G06F 3/00* (2006.01)
- *G06F 3/033* (2013.01)

(52) U.S. Cl.
USPC .......................................... 715/856; 345/157

(58) Field of Classification Search
USPC ......... 715/856, 857, 858, 859, 860, 861, 862; 345/157, 158, 160
See application file for complete search history.

(56) References Cited

U.S. PATENT DOCUMENTS

| | | | | |
|---|---|---|---|---|
| 4,653,100 A * | 3/1987 | Barnett et al. | ............... | 704/268 |
| 5,230,623 A * | 7/1993 | Guthrie et al. | ................. | 433/72 |
| 5,608,895 A * | 3/1997 | Lee | ................................ | 703/24 |
| 5,850,210 A * | 12/1998 | Wu | ................................ | 345/157 |
| 5,877,747 A * | 3/1999 | Kitao et al. | .................... | 345/160 |
| 6,154,205 A * | 11/2000 | Carroll et al. | ................. | 345/684 |
| 7,023,428 B2 * | 4/2006 | Pihlaja | ........................... | 345/173 |
| 7,196,806 B2 * | 3/2007 | Brown et al. | ................ | 358/1.15 |
| 2003/0016249 A1 * | 1/2003 | Cuijpers et al. | ............... | 345/810 |
| 2003/0231164 A1 * | 12/2003 | Blumer et al. | ................ | 345/159 |
| 2004/0095317 A1 * | 5/2004 | Zhang et al. | ................... | 345/158 |
| 2005/0104854 A1 * | 5/2005 | Su et al. | ......................... | 345/163 |
| 2005/0193350 A1 * | 9/2005 | Ishiguro et al. | ............... | 715/794 |
| 2006/0213976 A1 | 9/2006 | Inakoshi et al. | | |
| 2006/0257191 A1 * | 11/2006 | Artus | ............................ | 400/486 |
| 2007/0067744 A1 * | 3/2007 | Lane et al. | ..................... | 715/860 |
| 2007/0094619 A1 * | 4/2007 | Shirai | ............................ | 715/860 |
| 2007/0186191 A1 * | 8/2007 | Kraemer et al. | .............. | 715/856 |

FOREIGN PATENT DOCUMENTS

| | | |
|---|---|---|
| JP | 4-625 | 1/1992 |
| JP | 5-197466 | 8/1993 |
| JP | 9-204274 | 8/1997 |
| JP | 2000-89892 | 3/2000 |

(Continued)

OTHER PUBLICATIONS

Office Action issued Jan. 4, 2011, in Japanese Patent Application No. 2007-012899, filed Jan. 23, 2007.

*Primary Examiner* — Rashawn Tillery
(74) *Attorney, Agent, or Firm* — Oblon, Spivak, McClelland, Maier & Neustadt, L.L.P.

(57) ABSTRACT

A display control apparatus includes the following elements. An accepting unit accepts selection of one of objects displayed in a window in either a cursor mode, in which a cursor is moved to select an object, or a pointer mode, in which a pointer is moved to select an object, one of the modes being selected by a user. When an instruction to switch the pointer mode to the cursor mode is given, a display control unit erases the pointer and displays the cursor such that the cursor selects an object closest to a position where the pointer was displayed just before being erased.

9 Claims, 13 Drawing Sheets

(56) References Cited

FOREIGN PATENT DOCUMENTS

| | | |
|---|---|---|
| JP | 2000-357040 | 12/2000 |
| JP | 2004-537117 | 12/2004 |
| JP | 2005-242731 | 9/2005 |
| JP | 2006-268201 | 10/2006 |
| JP | 2006-279980 | 10/2006 |
| WO | WO 03/010649 A2 | 2/2003 |
| WO | WO 03/010649 A3 | 2/2003 |

* cited by examiner

APPARATUS, METHOD, AND PROGRAM FOR DISPLAY CONTROL

CROSS REFERENCES TO RELATED APPLICATIONS

The present invention contains subject matter related to Japanese Patent Application JP 2007-012899 filed in the Japanese Patent Office on Jan. 23, 2007, the entire contents of which are incorporated herein by reference.

BACKGROUND OF THE INVENTION

1. Field of the Invention

The present invention relates to apparatuses, methods and programs for display control and, more particularly, to a display control apparatus, method, and program which ensure a high degree of ease of operation after switching between modes for selecting an object displayed on a screen (or window).

2. Description of the Related Art

Personal computers having an audio visual (AV) function have been popular. Some of those personal computers are each provided with a remote control, as an accessory, similar to those of AV apparatuses, such as a television receiver and a hard disk recorder.

With the use of the remote control, a user can change a channel to select a television program displayed on the personal computer or control the volume of a piece of music played on the personal computer. In addition, the user can start a browser and view a web page using the remote control.

During viewing a web page, the user operates an arrow key on the remote control to move a pointer in order to select a linked image or character (or character string). Disadvantageously, the ease of use of the remote control operated in the above-described manner is lower than that of a mouse. To solve the disadvantage, some of the personal computers have a pointer mode and a cursor mode as modes for selection of an object, such as a character or an image. The pointer mode is used to select any object using a pointer. The cursor mode is used to select any object using a cursor.

In the cursor mode, the cursor is displayed such that the cursor selects any one of objects displayed in a window. Each time the arrow key is operated, the cursor is moved such that the selected object is changed to another one. Accordingly, the user repetitively presses up, down, left, and right arrow buttons included in the arrow key until a target object is selected. When the target object is selected, the user operates the remote control to determine the selected object, so that a web page linked to the selected object can be displayed in the window.

Japanese Unexamined Patent Application Publication No. 2006-268201 discloses a technique of obtaining the degree of association between RSS articles and managing the articles in accordance with the degrees of association.

SUMMARY OF THE INVENTION

When an object selection mode is switched to another mode, for example, when the pointer mode is switched to the cursor mode, or vice versa, the ease of operation may be significantly reduced depending on a default position of the cursor or that of the pointer just after switching.

For example, it is assumed that the user scrolls a web page while selecting the pointer mode and then switches the pointer mode to the cursor mode at some point in time. If the cursor is displayed in such a default position that the cursor selects the first object in the web page in response to the switching operation, a viewable portion of the web page is different from that the user has viewed just before switching between the modes. Disadvantageously, the portion of the web page displayed before scrolling is again displayed in response to the switching operation, thus reducing the ease of operation.

The present invention is made in consideration of the above-described disadvantages. It is desirable to improve the ease of operation after switching between modes for selecting an object displayed in a window.

According to an embodiment of the present invention, a display control apparatus includes the following elements. An accepting unit accepts selection of one of objects displayed in a window in either a cursor mode, in which a cursor is moved to select an object, or a pointer mode, in which a pointer is moved to select an object, one of the modes being selected by a user. When an instruction to switch the pointer mode to the cursor mode is given, a display control unit erases the pointer and displays the cursor such that the cursor selects an object closest to a position where the pointer was displayed just before being erased.

The display control unit may move the cursor or the pointer in response to an operation on an arrow key disposed on a remote control.

The objects displayed in the window may be characters or images linked to other data sets. In this case, when a predetermined object is selected by the cursor or the pointer and an operation of determining the selected object is performed, the display control unit displays a window related to a data set linked to the object selected by the cursor or the pointer.

According to another embodiment of the present invention, a method for display control includes the steps of accepting selection of one of objects displayed in a window in either a cursor mode, in which a cursor is moved to select an object, or a pointer mode, in which a pointer is moved to select an object, selected by a user, and when an instruction to switch the pointer mode to the cursor mode is given, erasing the pointer and displaying the cursor such that the cursor selects an object closest to a position where the pointer was displayed just before being erased.

According to another embodiment of the present invention, there is provided a program that allows a computer to execute a process including the steps of accepting selection of one of objects displayed in a window in either a cursor mode, in which a cursor is moved to select an object, or a pointer mode, in which a pointer is moved to select an object, selected by a user, and when an instruction to switch the pointer mode to the cursor mode is given, erasing the pointer and displaying the cursor such that the cursor selects an object closest to a position where the pointer was displayed just before being erased.

According to the above-described embodiments, selection of one of objects displayed in a window is accepted in either the cursor mode, in which the cursor is moved to select an object, or the pointer mode, in which the pointer is moved to select an object, selected by the user. When an instruction to switch the pointer mode to the cursor mode is given, the pointer is erased and the cursor is displayed such that the cursor selects an object closest to a position where the pointer was displayed just before being erased.

According to the embodiments of the present invention, the ease of operation after switching between the modes for selecting an object displayed in a window can be improved.

DESCRIPTION OF THE PREFERRED EMBODIMENTS

Before describing an embodiment of the present invention, the correspondence between the features of the present invention and the specific elements disclosed in an embodiment of the present invention in the specification and the drawings is discussed below. This description is intended to assure that embodiments supporting the claimed invention are described in this specification and the drawings. Thus, even if an element in the following embodiments or the drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, a display control apparatus (for example, an information processing apparatus 1 in FIG. 1) includes the following elements. An accepting unit (e.g., a user operation determining unit 51 in FIG. 11) accepts selection of one of objects displayed in a window in either a cursor mode, in which a cursor is moved to select an object, or a pointer mode, in which a pointer is moved to select an object, one of the modes being selected by a user. When an instruction to switch the pointer mode to the cursor mode is given, a display control unit (e.g., a display control unit 52 in FIG. 11) erases the pointer and displays the cursor such that the cursor selects an object closest to a position where the pointer was displayed just before being erased.

Figure 12:
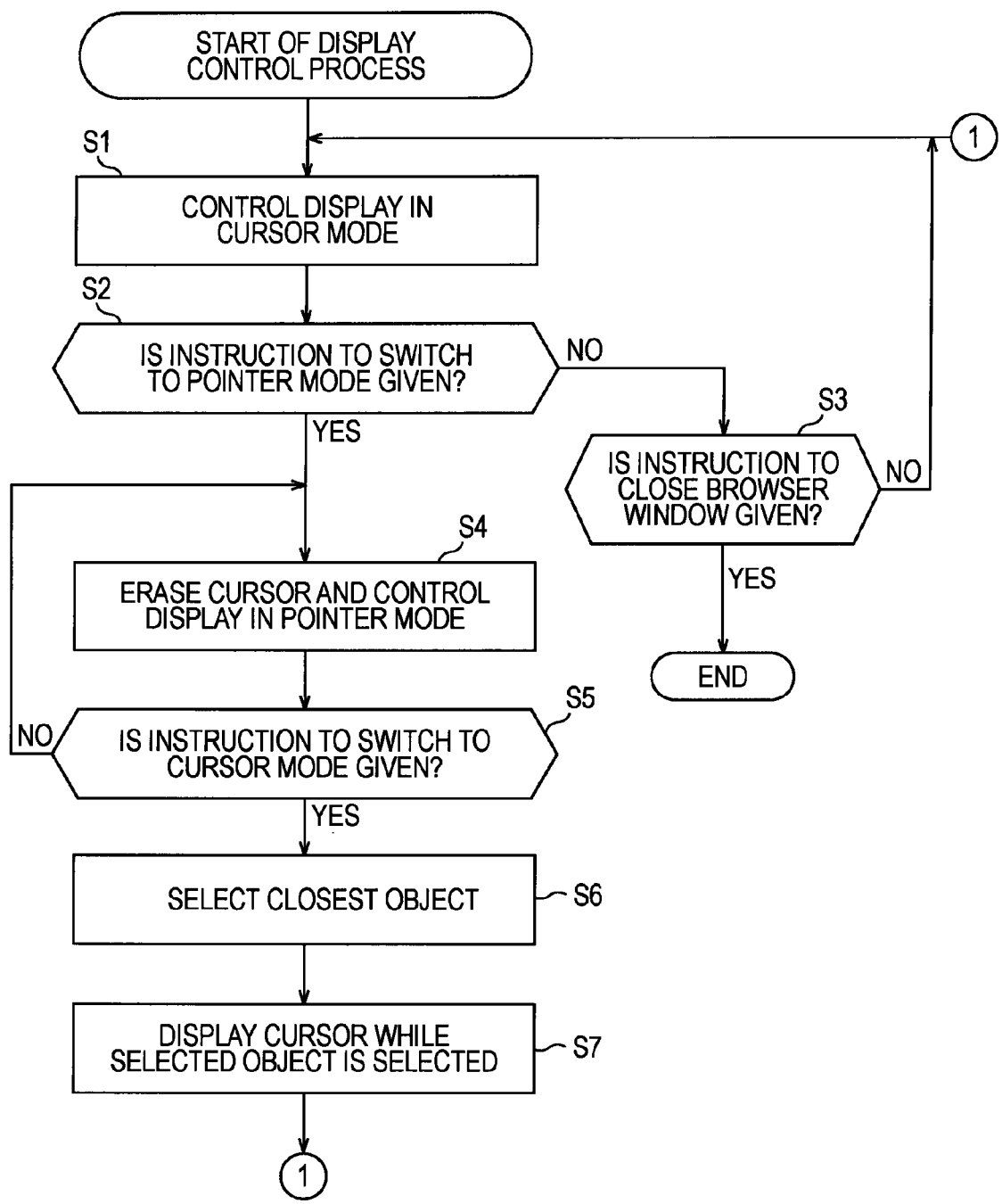
FIG. 12 is a flowchart of a display control process by the information processing apparatus.

According to another embodiment of the present invention, a method for display control includes the steps of accepting selection of one of objects displayed in a window in either a cursor mode, in which a cursor is moved to select an object, or a pointer mode, in which a pointer is moved to select an object, selected by a user, and when an instruction to switch the pointer mode to the cursor mode is given, erasing the pointer and displaying the cursor such that the cursor selects an object closest to a position where the pointer was displayed just before being erased (for example, step S7 in FIG. 12).

According to another embodiment of the present invention, there is provided a program that allows a computer to execute a process including the steps of accepting selection of one of objects displayed in a window in either a cursor mode, in which a cursor is moved to select an object, or a pointer mode, in which a pointer is moved to select an object, selected by a user, and when an instruction to switch the pointer mode to the cursor mode is given, erasing the pointer and displaying the cursor such that the cursor selects an object closest to a position where the pointer was displayed just before being erased (for example, step S7 in FIG. 12).

An embodiment of the present invention will be described below with reference to the drawings.

Figure 1:
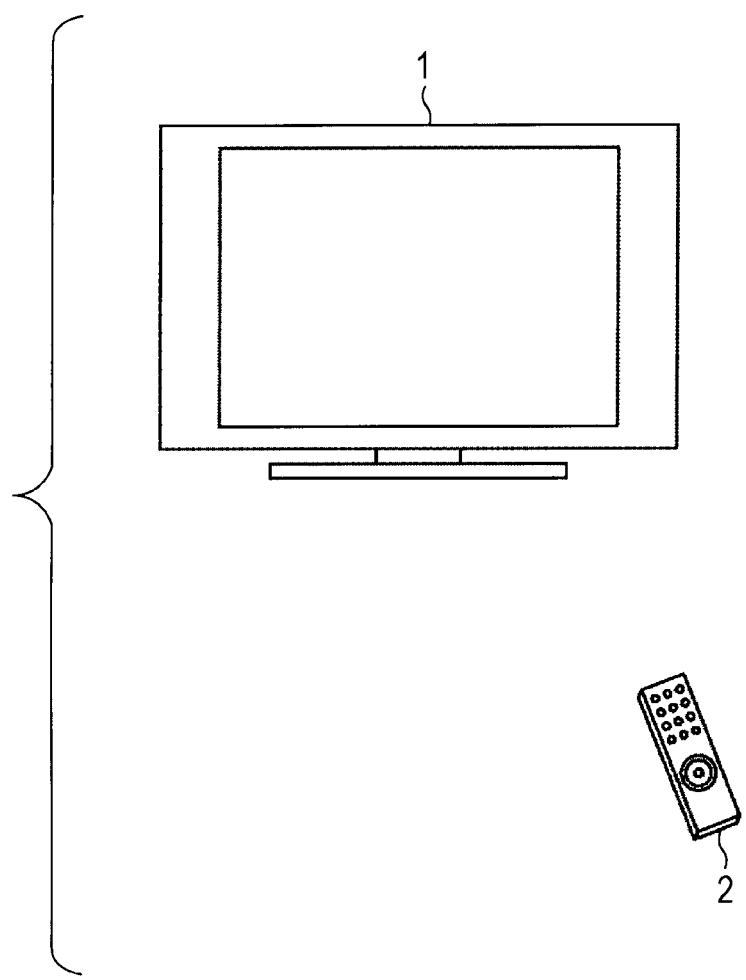
FIG. 1 is a diagram illustrating an information processing apparatus according to an embodiment of the present invention.

FIG. 1 illustrates an information processing apparatus 1 according to an embodiment of the present invention.

Referring to FIG. 1, the information processing apparatus 1 is a television receiver. The information processing apparatus 1 has an operating system, such as Windows® XP, and also functions as a personal computer.

The information processing apparatus 1 is equipped with a remote control 2. A user can change a channel of a television (TV) program displayed on a display of the information processing apparatus 1 or control the volume of sound output from a speaker by operating the remote control 2.

In addition, the user can start a browser and view a web page using the remote control 2.

The information processing apparatus 1 has two selection modes for selecting an object, such as a character (or character string) or an image, linked to another web page. The two modes include a cursor mode in which selection can be made using a cursor and a pointer mode in which selection can be carried out using a pointer.

When the cursor mode is selected, the cursor is displayed such that the cursor selects one object in a browser window. The user operates an arrow key disposed on the remote control 2 to change an object to be selected by the cursor and presses an ENTER button while a target object is selected, so that a web page linked to this selected object can be displayed.

When the pointer mode is selected, the pointer is displayed in the browser window. The pointer can be moved not only to an object, such as a character string or an image, linked to a web page but also to any position in the window. The user operates the arrow key on the remote control 2 to move the pointer and presses the ENTER button while the pointer indicates (selects) a target object, so that a web page linked to this selected object can be displayed.

Figure 2:
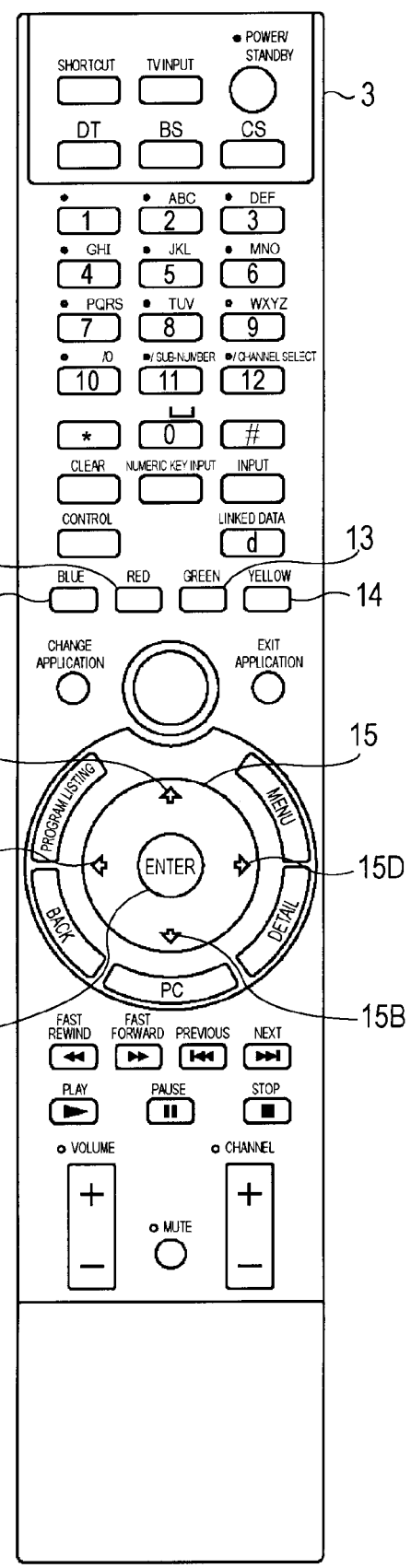
FIG. 2 is an external view of a remote control.

FIG. 2 is an external view of the remote control 2.

The remote control 2 includes a POWER button which is operated to turn on or off the information processing apparatus 1, numeric keys which are operated to change a receiving channel, a BLUE button 11, a RED button 12, a GREEN button 13, and a YELLOW button 14.

Various functions are assigned to the BLUE button 11, the RED button 12, the GREEN button 13, and the YELLOW button 14 in accordance with an application running at that time.

For example, assuming that the browser is started and the user allows the apparatus to display a browser window, the BLUE button 11 is assigned with a function of scrolling up a web page and the RED button 12 is assigned with a function of scrolling down the web page.

The GREEN button 13 is assigned with a function of zooming in or out the web page and the YELLOW button 14 is assigned with a function of switching between the above-described cursor and pointer modes. Pressing the YELLOW button 14 alternately selects the cursor mode and the pointer mode.

The remote control 2 also has the arrow key, indicated at 15, including a circular member. In the arrow key 15, part marked with an up arrow serves as an up arrow button 15A, part marked with a down arrow serves as a down arrow button 15B, part marked with a left arrow serves as a left arrow button 15C, and part marked with a right arrow serves as a right arrow button 15D. The ENTER button, indicated at 16, for determination is disposed at the center of the arrow key 15.

Display of a browser window will now be described.

Figure 3:
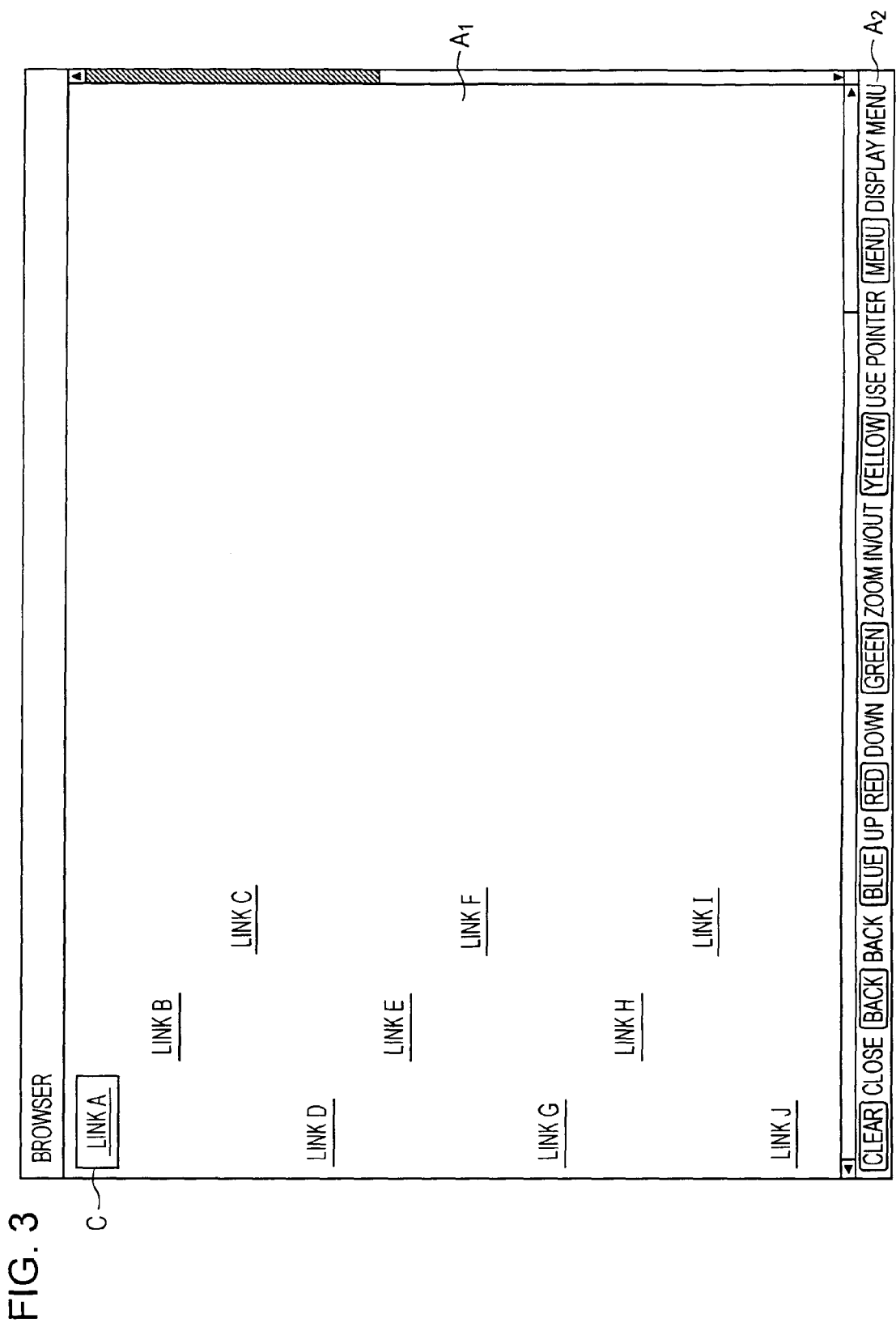
FIG. 3 is a diagram illustrating a window displayed on a display.

FIG. 3 illustrates a browser window displayed on the display of the information processing apparatus 1.

Referring to FIG. 3, the browser window includes a region $A_1$ and a region $A_2$. The region $A_1$ covers large part of the entire browser window and displays a web page. A portion of the web page displayed in the region $A_1$ is indicated by a scroll bar arranged in the right end of the region $A_1$. Specifically, a hatched area in the scroll bar indicates a viewable portion of the entire web page.

In FIG. 3, character strings "LINK A" to "LINK J" linked to other web pages are displayed with underlines, respectively. In addition to the above-described character strings "LINK A" to "LINK J", unlinked character strings and images may actually be displayed in the region $A_1$ on the basis of a Hyper Text Markup Language (HTML) file acquired from a web server.

Referring to FIG. 3, the cursor, indicated at C, is displayed in the browser window such that the cursor C selects the character string "LINK A". In this case, the cursor mode is set as a default selection mode so that the cursor mode is automatically selected when a browser window is displayed.

The user can move the cursor C to another linked character string (object) by operating the arrow key 15 on the remote control 2. When radio buttons, check boxes, and a text box are displayed, the user can move the cursor C to highlight any of those objects.

The region $A_2$ arranged in the bottom of the browser window displays captions explaining functions assigned to the buttons on the remote control 2.

Referring to FIG. 3, as will be obviously understood from the displayed captions, a CLEAR button is assigned with a function of closing the browser window and a BACK button is assigned with a function of returning to display of the preceding web page.

Furthermore, as will be obviously understood from the captions, the BLUE button 11, the RED button 12, the GREEN button 13, and the YELLOW button 14 are assigned with the foregoing functions, respectively. In addition, a MENU button is assigned with a function of displaying a menu.

Figure 4:
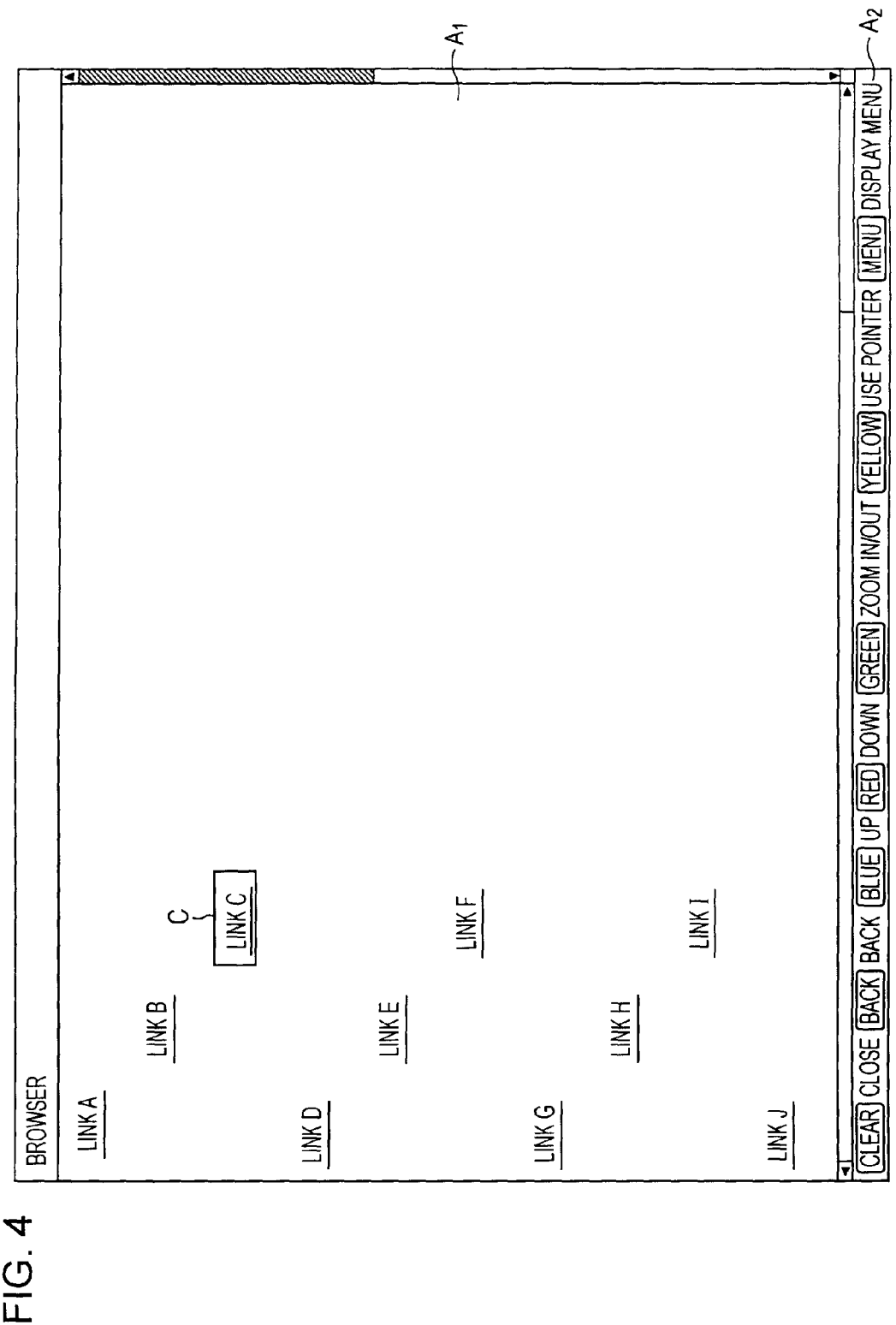
FIG. 4 is a diagram illustrating another window displayed on the display.

FIG. 4 shows another browser window displayed when the user presses the right arrow button 15D in the arrow key 15 two times while the browser window of FIG. 3 is displayed.

Each time the right arrow button 15D is pressed once, the position of the cursor C is shifted. First pressing on the right arrow button 15D selects the object "LINK B" which is to the right of the object "LINK A" and is the closest thereto. Second pressing thereon selects the "LINK C" which is to the right of the object "LINK B" and is the closest thereto, as shown in FIG. 4. In this state, when the ENTER button 16 is pressed once, a web page linked to the object "LINK C" is displayed in the region $A_1$.

When another button in the arrow key 15 is pressed, similarly, the cursor C is moved so as to select an object, which is located in the same direction as that indicated by the pressed button and is the closest to the position of the cursor C before pressing the relevant arrow button.

Figure 5:
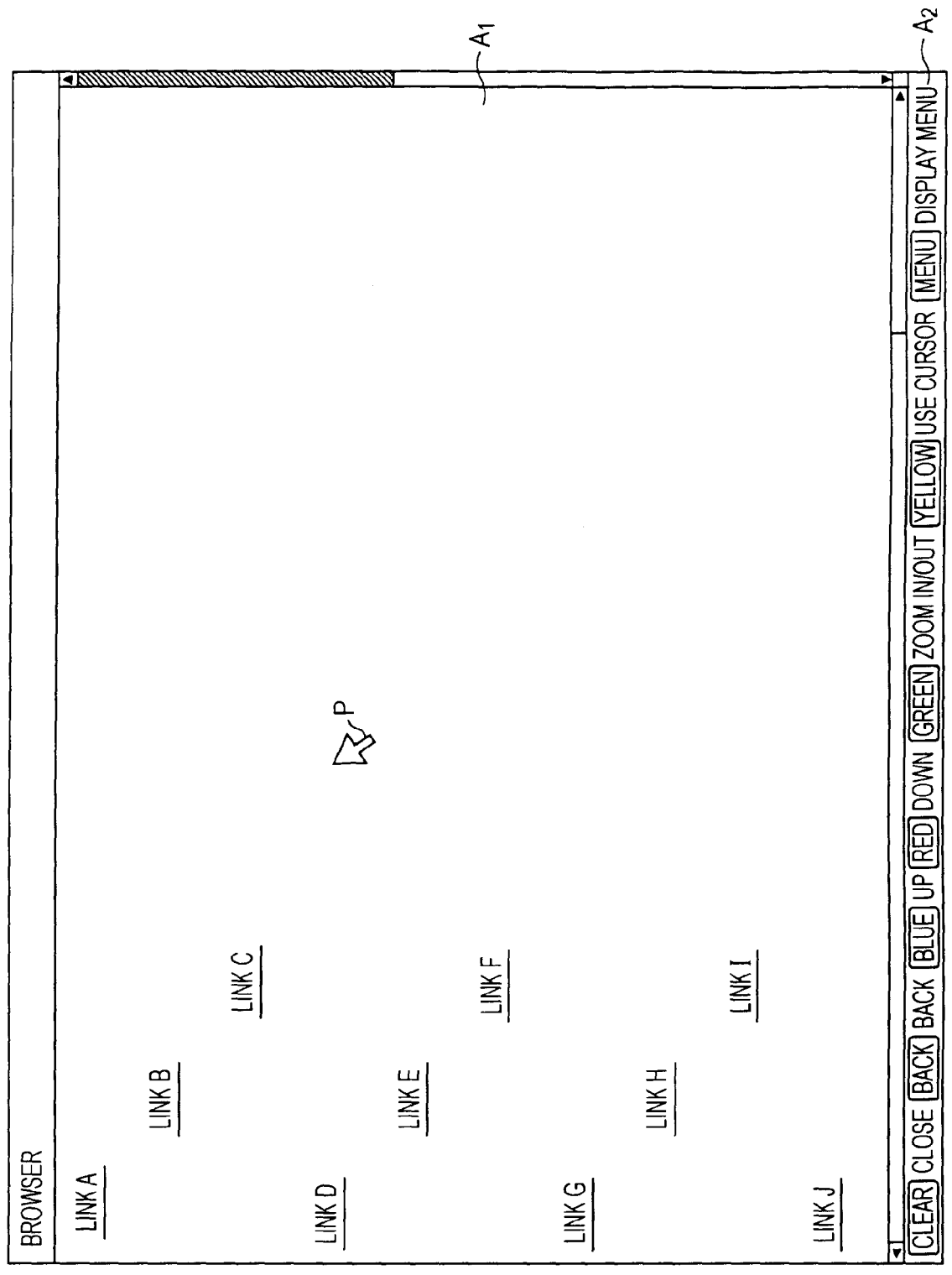
FIG. 5 is a diagram illustrating another window displayed on the display.

FIG. 5 shows another browser window obtained when the selection mode is switched from the cursor mode to the pointer mode.

When the cursor mode is switched to the pointer mode, the cursor C is erased and the pointer, indicated at P, is displayed in a predetermined position, as shown in FIG. 5. The user can move the pointer P not only to any of selectable objects but also to any position in the browser window by operating the arrow key 15 on the remote control 2. For example, when the pointer P is moved onto the object "LINK C" and the ENTER button 16 is pressed once while the pointer P indicates the object "LINK C", a web page linked to the object "LINK C" is displayed in the region $A_1$.

Figure 6:
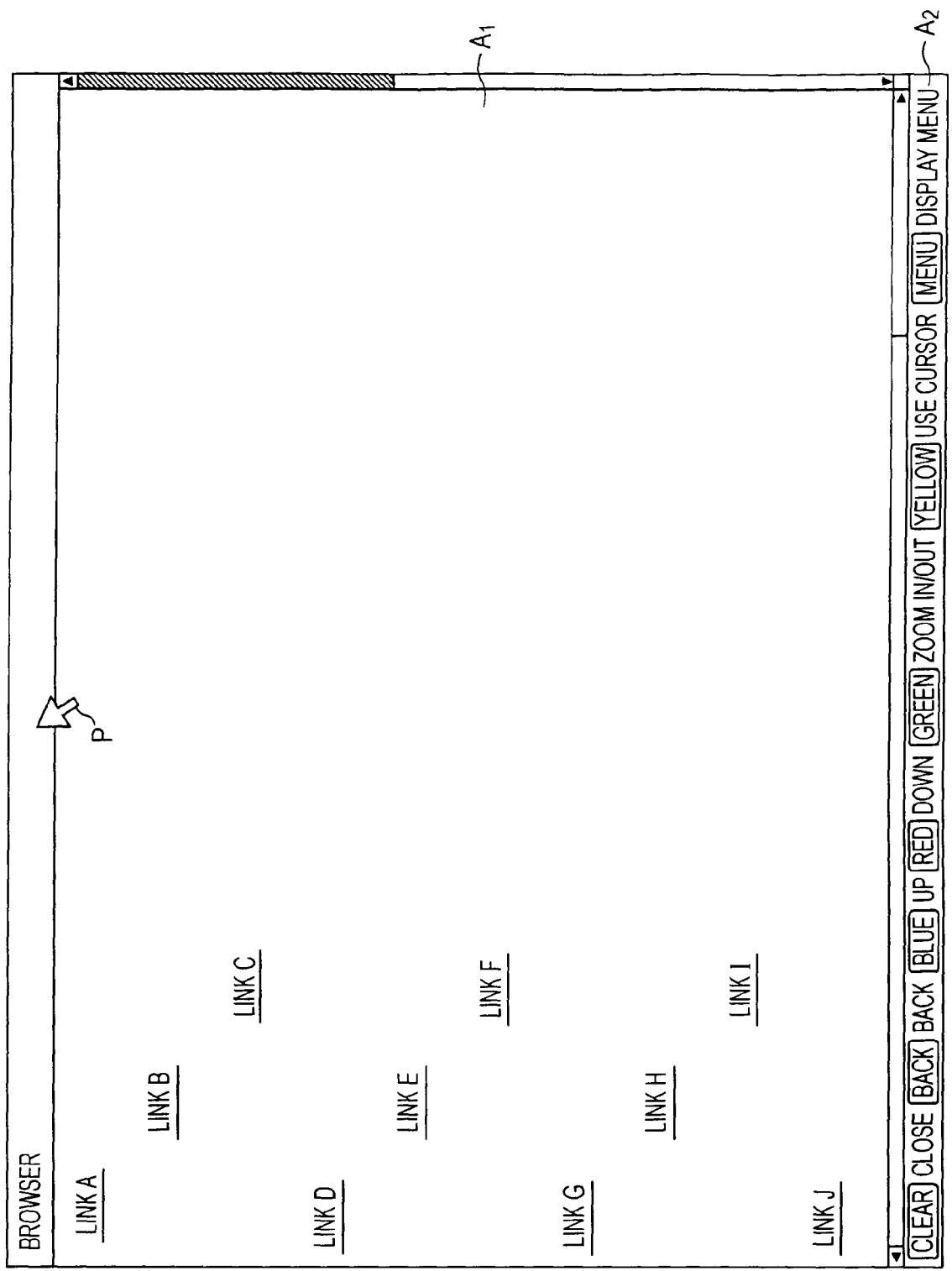
FIG. 6 is a diagram illustrating another window displayed on the display.

In the pointer mode, when the BLUE button 11 is pressed, the web page can be scrolled up. As shown in FIG. 6, moving the pointer P to the upper end of the browser window can also scroll the web page up.

Figure 7:
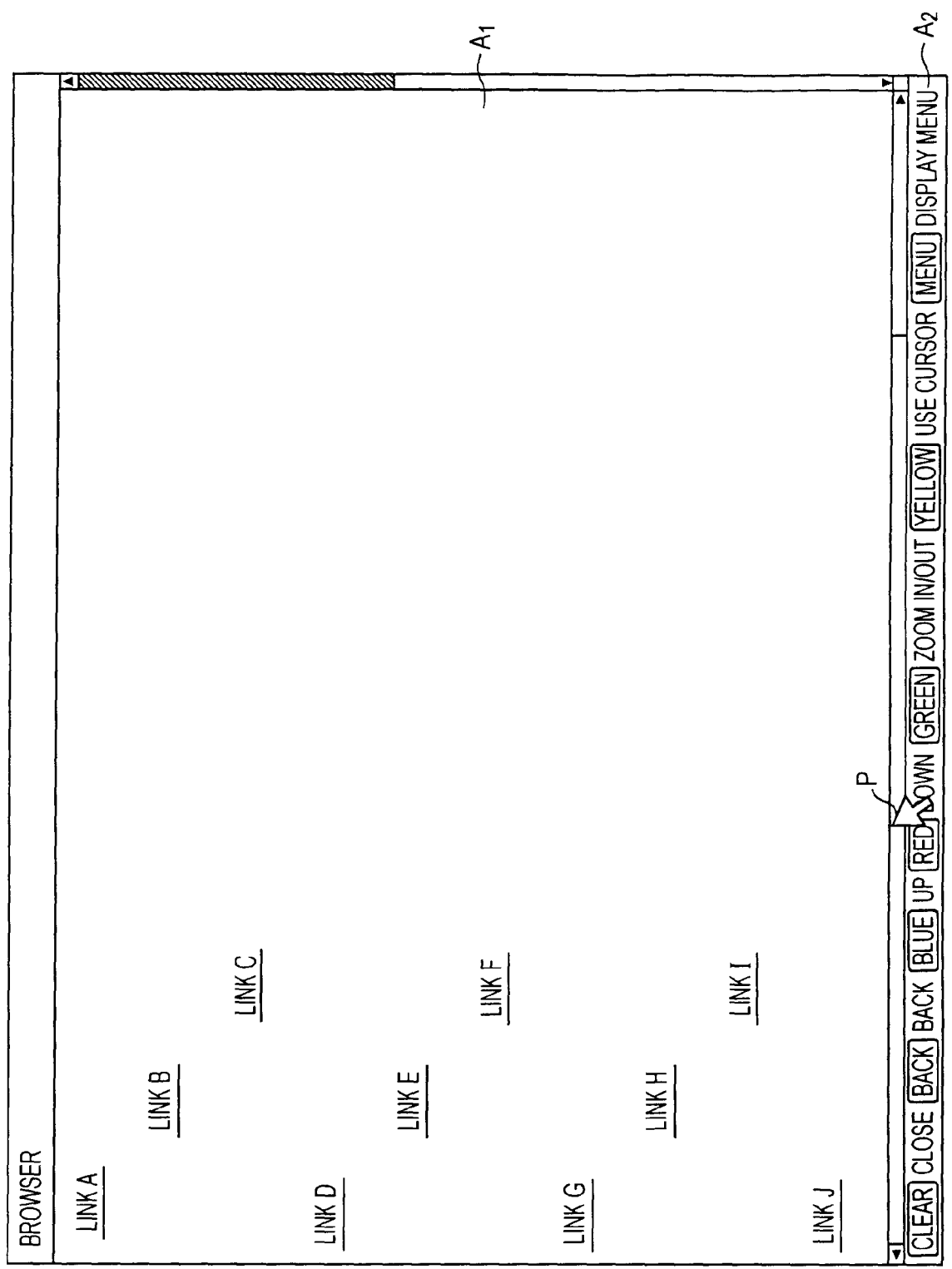
FIG. 7 is a diagram illustrating another window displayed on the display.

Instead of pressing the RED button 12, as shown in FIG. 7, moving the pointer P to the lower end of the browser window can scroll the web page down.

Figure 8:
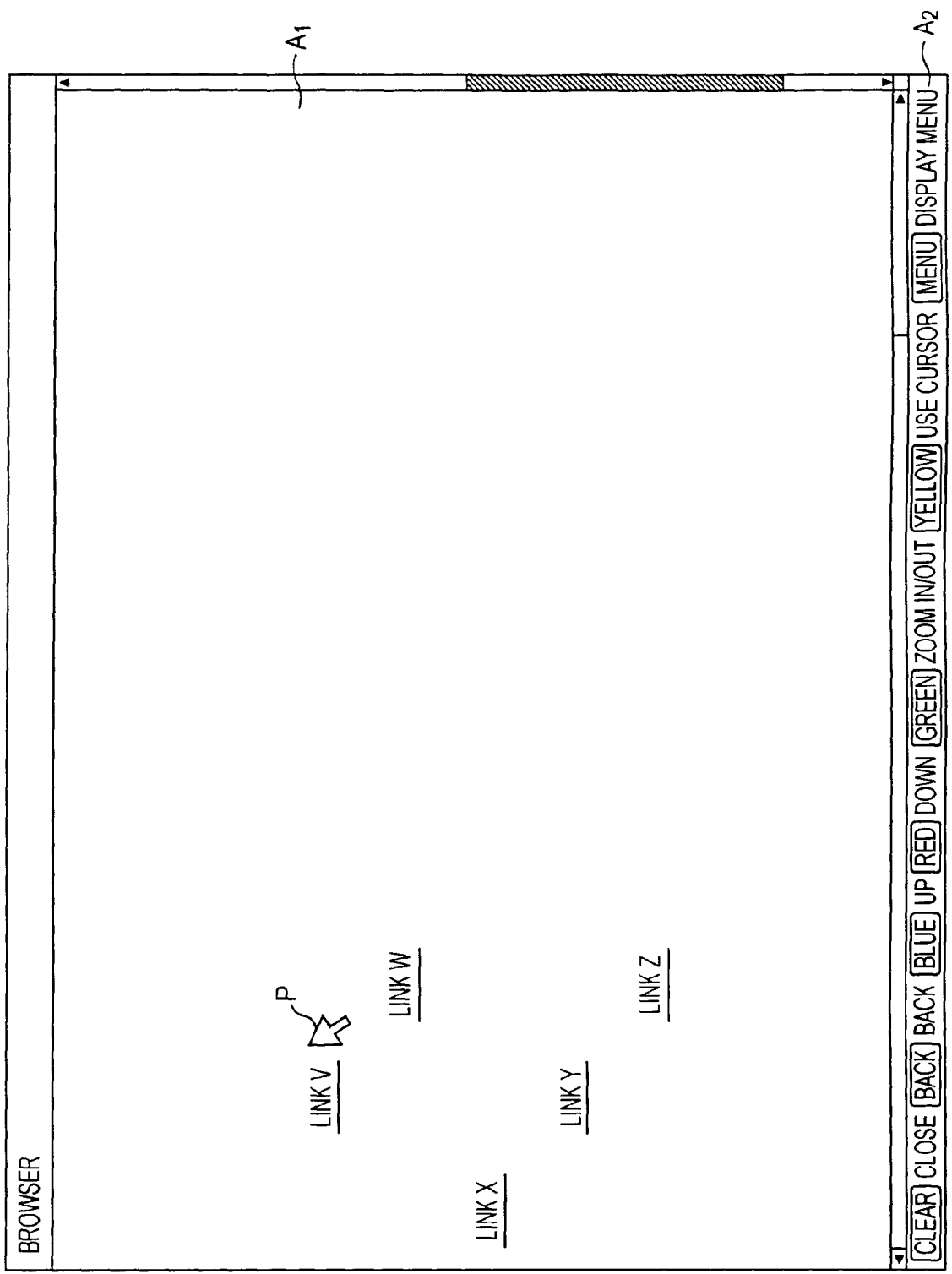
FIG. 8 is a diagram illustrating another window displayed on the display.

FIG. 8 illustrates a browser window obtained by scrolling the web page of FIG. 7 down in the pointer mode to change the viewable portion of the web page to another lower portion.

Referring to FIG. 8, character string objects "LINK V" to "LINK Z" linked to other web pages are displayed with underlines, respectively. The pointer P is displayed near the object "LINK V".

Figure 9:
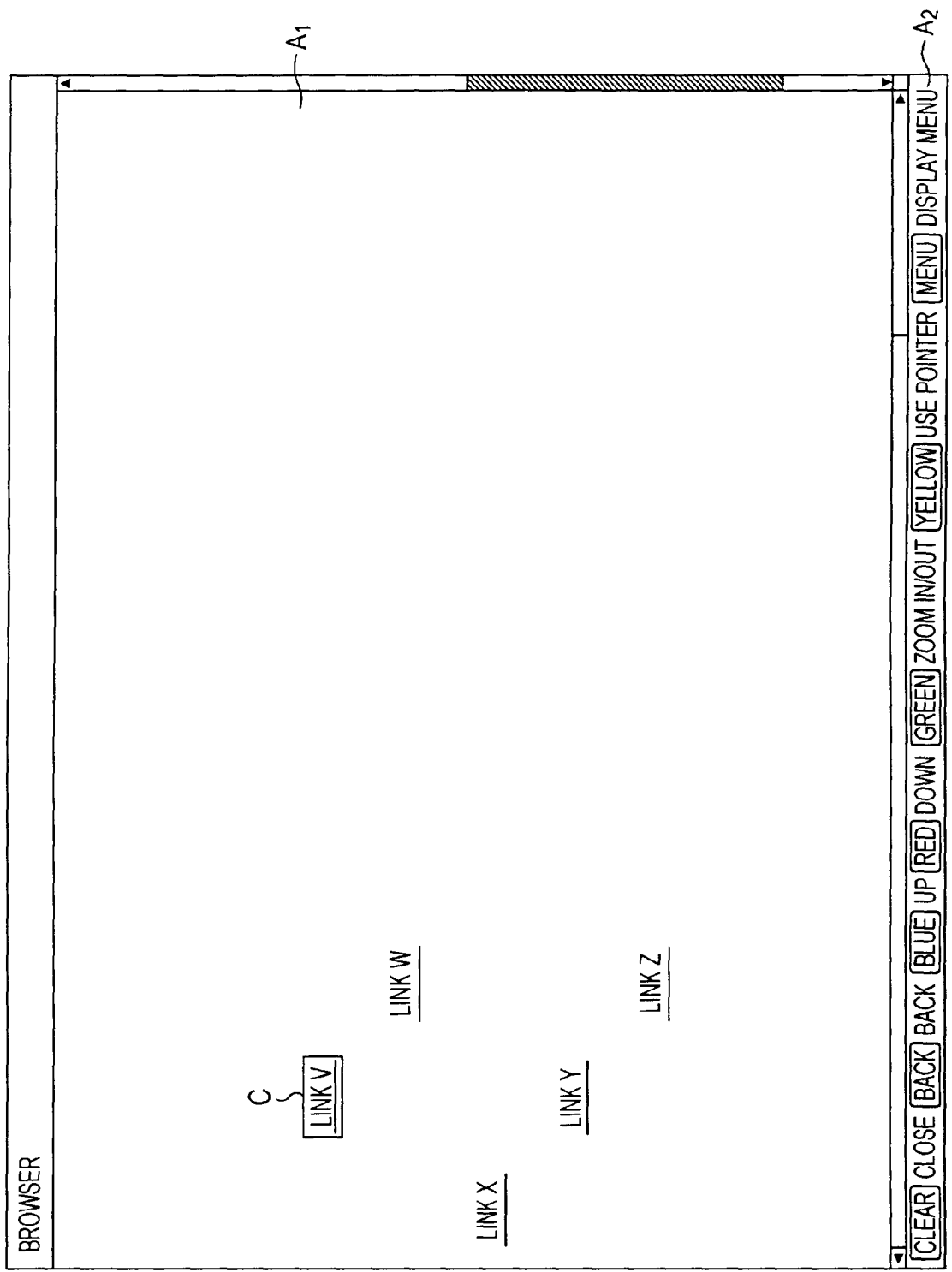
FIG. 9 is a diagram illustrating another window displayed on the display.

It is assumed that while the browser window of FIG. 8 is displayed, the YELLOW button 14 is pressed once to give an instruction to switch the selection mode from the pointer mode to the cursor mode. As shown in FIG. 9, the viewable portion of the web page is the same as that before switching the selection mode, the pointer P is erased, and the cursor C is displayed such that the cursor C selects the object "LINK V" which is the closest to the position where the pointer P was displayed.

Similarly, when an instruction to switch the selection mode from the pointer mode to the cursor mode is given while the pointer P is located near the object "LINK Z", the cursor C is displayed such that the cursor C selects the object "LINK Z" which is the closest to the position where the pointer P was displayed just before being erased.

As for the closest character string (object), for example, the distance between the barycentric position of the pointer P and that of each of the objects is obtained and the object related to the shortest distance is selected as the closest one. Alternatively, the distance between the tip of the pointer P and the position of each of the objects may be obtained and the object related to the shortest distance may be selected as the closets one.

Consequently, when the selection mode is switched to another mode, the viewable portion of the web page is not changed in response to the switching operation. The cursor C is displayed such that the cursor C selects an object near a position where the pointer P was displayed. Advantageously, the ease of operation is not reduced.

For example, assuming that an instruction to switch the pointer mode to the cursor mode is given while the browser window as shown in FIG. 8 is displayed, if the cursor C is displayed in such a default position that the cursor C selects the first object "LINK A" as shown in FIG. 3 in response to the switching operation, the viewable portion of the web page is changed. Disadvantageously, the ease of operation is significantly lowered. According to the present embodiment, since the cursor C is displayed such that the cursor C selects an object closest to the position where the pointer P was displayed, the above-described disadvantage can be prevented. The ease of operation can be improved.

A process, performed by the information processing apparatus 1, for controlling display of a browser window as described above will be described later with reference to a flowchart.

Figure 10:
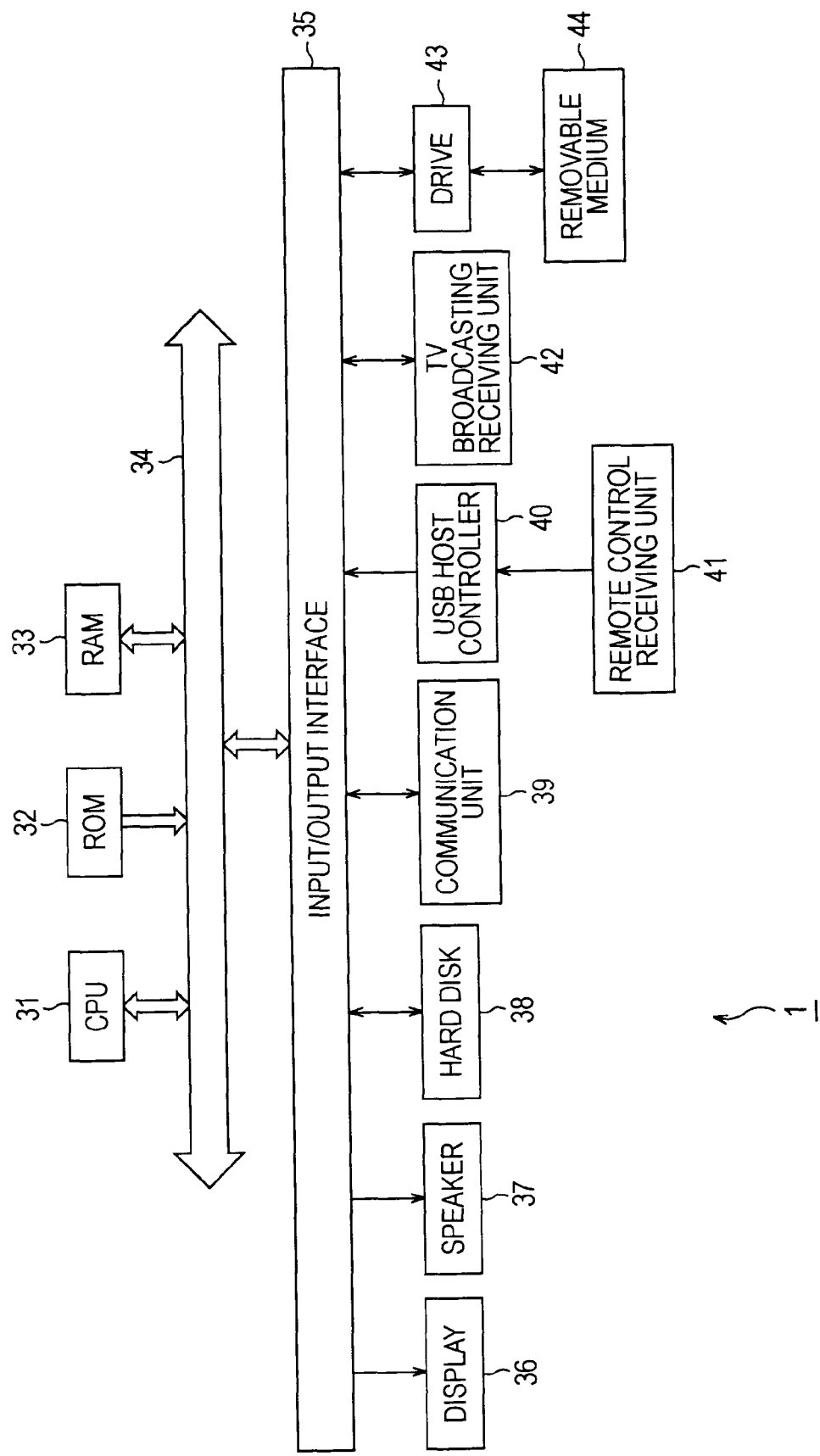
FIG. 10 is a block diagram of the hardware configuration of the information processing apparatus.

FIG. 10 is a block diagram of the hardware configuration of the information processing apparatus 1.

A central processing unit (CPU) 31 executes various processes in accordance with a program stored in a read only memory (ROM) 32 and a program loaded from a hard disk 38 to a random access memory (RAM) 33. The RAM 33 appropriately stores data necessary for the CPU 31 to execute the various processes.

The CPU 31, the ROM 32, and the RAM 33 are connected to a bus 34 such that those units are connected to each other. The bus 34 is further connected to an input/output interface 35.

The input/output interface 35 is connected to a display 36 including a liquid crystal display (LCD), a speaker 37, a hard disk 38, and a communication unit 39 for communication via a network. An HTML file used for displaying a browser window is acquired from a web server by communication through the communication unit 39.

The input/output interface 35 is further connected to a USB host controller 40, a television (TV) broadcasting receiving unit 42, and a drive 43. The USB host controller 40 receives a signal transmitted from the remote control 2 through a remote control receiving unit 41 connected as a USB device.

The TV broadcasting receiving unit 42 receives a signal sent from an antenna (not shown) for receiving a television broadcasting wave to acquire data related to television (TV) programs to be broadcast on a predetermined channel. The TV program data acquired by the TV broadcasting receiving unit 42 is supplied to the display 36 and/or the hard disk 38 through the input/output interface 35 and is used for program display and/or program recording.

The drive 43 is loaded with a removable medium 44 including an optical disk, such as a Blu-ray Disc (registered trademark) or a digital versatile disc (DVD). A computer program read from the removable medium 44 through the drive 43 is installed into the hard disk 38 as necessary.

Figure 11:
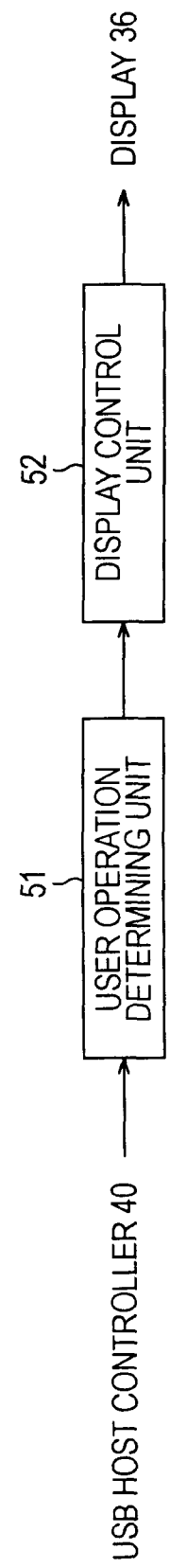
FIG. 11 is a block diagram of the functional structure of the information processing apparatus.

FIG. 11 is a block diagram of the functional structure of the information processing apparatus 1. At least one part of the functional units shown in FIG. 11 is realized by executing a predetermined program through the CPU 31 in FIG. 10.

Referring to FIG. 11, a user operation determining unit 51 and a display control unit 52 are realized in the information processing apparatus 1. A signal, transmitted from the remote control 2 and accepted by the USB host controller 40, is supplied to the user operation determining unit 51.

The user operation determining unit 51 determines the details of an operation, which the user has performed using the remote control 2, on the basis of a signal supplied from the USB host controller 40 and outputs information indicating the determined details of the user operation to the display control unit 52. For example, the user operation determining unit 51 determines the fact that the user has given an instruction to start a browser in the menu, the fact that the user has pressed the YELLOW button 14 to give an instruction to change the selection mode, or the fact that the user has operated the arrow key 15 to give an instruction to move the cursor or the pointer.

The display control unit 52 controls display by the display 36. The display control unit 52 changes display of a browser window in accordance with a user instruction indicated by information supplied from the user operation determining unit 51.

A process, performed by the information processing apparatus 1, for controlling display of a browser window will now be described with reference to a flowchart of FIG. 12. This process is started when the display control unit 52 displays a browser window.

In step S1, the display control unit 52 controls display of the browser window in the cursor mode in accordance with a user instruction indicated by information supplied from the user operation determining unit 51.

Specifically, the display control unit 52 moves the cursor C each time the user operates the arrow key 15 and changes a viewable portion of a web page in response to operations on the BLUE button 11 and the RED button 12. In addition, when the ENTER button 16 is pressed while a linked object is being selected by the cursor C, the display control unit 52 controls the communication unit 39 to acquire an HTML file of a web page linked to the selected object and changes display in the region $A_1$ on the basis of the acquired HTML file.

In step S2, the display control unit 52 determines whether an instruction to switch the selection mode from the cursor mode to the pointer mode is given.

When it is determined in step S2 that the instruction to switch the cursor mode to the pointer mode is not given, the display control unit 52 determines whether an instruction to close the browser window is given.

When it is determined in step S3 that the instruction to close the browser window is not given, the processing routine is returned to step S1 and the display in the cursor mode is continued.

On the other hand, when it is determined in step S2 that the instruction to switch the selection mode from the cursor mode to the pointer mode is given, the display control unit 52 erases the cursor C and displays the pointer P in the browser window to control the display of the browser window in the pointer mode in step S4.

The display control unit 52 moves the pointer P in response to a user operation on the arrow key 15 and changes a viewable portion of the web page in response to operations on the BLUE button 11 and the RED button 12. Furthermore, when the ENTER button 16 is pressed while a linked object is pointed by the pointer P, the display control unit 52 controls the communication unit 39 to acquire an HTML file of a web page linked to the pointed object and changes the display of the region $A_1$ on the basis of the acquired HTML file.

In step S5, the display control unit 52 determines whether an instruction to switch the selection mode from the pointer mode to the cursor mode is given.

When it is determined in step S5 that the instruction to switch the pointer mode to the cursor mode is not given, the processing routine is returned to step S4 and the display in the pointer mode is continued.

On the other hand, when it is determined in step S5 that the instruction to switch the selection mode from the pointer mode to the cursor mode is given, the display control unit 52 selects one object, which is closest to a position where the pointer P was displayed, in step S6.

In step S7, the display control unit 52 erases the pointer P and displays the cursor C such that the cursor C selects the object selected in step S6. After that, the processing routine is returned to step S1 and the display control unit 52 controls the display of the browser window in the cursor mode.

When the CLEAR button on the remote control 2 is pressed and it is determined in step S3 that an instruction to close the browser window is given, the display control unit 52 closes the browser window and terminates the process.

According to the above-described process, when the selection mode is switched from the pointer mode to the cursor mode, the cursor C is displayed such that the cursor C selects an object closest to a position where the pointer P was displayed in the window after the switching operation. Advantageously, the ease of operation after switching between the selection modes can be increased.

The display of the browser window has been described. The above-described display switching operation can be performed on any window so long as the window includes objects selectable using the cursor or the pointer.

In the above description, the cursor C is indicated by a rectangular frame. How to highlight a target object is not limited to the above-described example using the cursor C. So long as operating the arrow key 15 moves a highlighting portion to change an object to be selected, any highlighting method can be used. For example, a selected object may be highlighted with a color different from that for unselected objects. Each time the arrow key 15 is operated, the highlighted object may be switched to another object.

In the above description, the pointer P is shown as an open arrow. Instead of the pointer P, any specifying tool may be used so long as the position thereof is shifted each time the arrow key 15 is operated.

As described above, the objects selectable using the cursor C include character strings, images, radio buttons, check boxes, and a text box which are linked to other web pages. Any object displayed in another form may be selected using the cursor C provided that performing a predetermined operation, for example, pressing the ENTER button while an object is selected by the cursor C allows the information processing apparatus 1 to perform a process.

The display resulted from the operation using the remote control 2 has been described. The above-described display may be obtained in response to an operation using another input device, e.g., a mouse.

The information processing apparatus 1 having the same form as that of a typical television receiver has been described. The information processing apparatus 1 may be realized as a device separated from a television receiver, as shown in FIG. 13.

Figure 13:
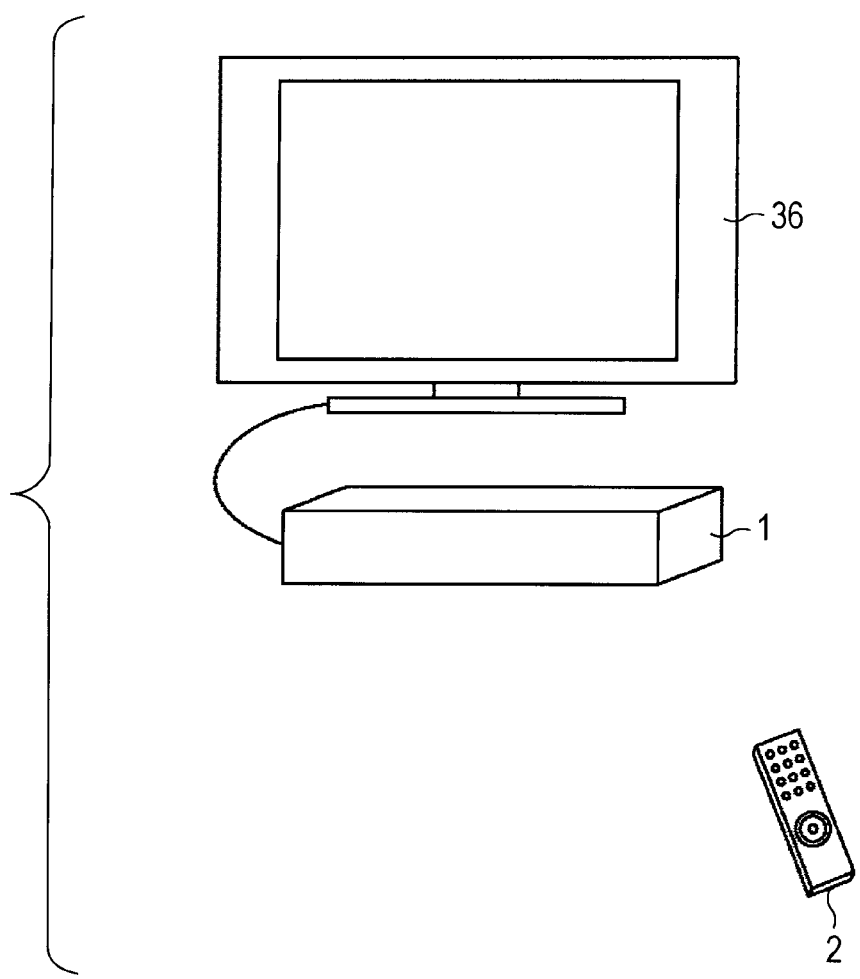
FIG. 13 is a diagram illustrating another form of the information processing apparatus.

Referring to FIG. 13, the information processing apparatus 1 is connected to the display 36 via a cable. The information processing apparatus 1 controls display of the display 36 in the above-described manner.

The above-described series of processing steps can be executed by hardware or software. When the above-described series of processing steps is executed by software, a program constituting the software is installed from a program recording medium into a computer incorporated in dedicated hardware or into a multi-purpose personal computer which is capable of executing various functions by installing various programs and has a structure as shown in FIG. 10.

As for the program executed by the computer (the CPU 31), the program recorded on the removable medium 44 including an optical disk may be provided. Alternatively, the program may be transferred through a wired or wireless transmission medium, such as a local area network, the Internet, or digital satellite broadcasting.

After the removable medium 44 is loaded into the drive 43, the program may be installed to the hard disk 38 through the input/output interface 35. Alternatively, the program may be received by the communication unit 39 through the wired or wireless transmission medium and be then installed to the hard disk 38. Alternatively, the program may be previously installed in the ROM 32 or the hard disk 38.

The program executed by the computer may be a program including processing steps which are carried out in time series in the described order in this specification or a program including processing steps which are carried out in parallel or individually at necessary timing, for example, in response to a call request.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
    an accepting unit that accepts selection of one of objects displayed on a screen in either a cursor mode in which a cursor is moved to select the object or a pointer mode in which a pointer is moved to select the same object, one of the modes being selected by a user; and
    a display control unit that, when an instruction to switch the pointer mode to the cursor mode is given, erases the pointer and displays the cursor such that the cursor selects an object closest to a position where the pointer was displayed just before being erased,
    wherein after the pointer mode is selected, the pointer is movable over an entire screen area in response to user input and remains visible and stationary at any point on the entire screen when no user input is received,
    wherein the position where the pointer was displayed just before being erased due to the given instruction to switch the pointer mode to the cursor mode is a point where no object is displayed on the screen.

2. The apparatus according to claim 1, wherein the means for erasing moves the cursor or the pointer in response to an operation on an arrow key disposed on a remote control.

3. The apparatus according to claim 1, wherein
    the objects displayed on the screen are characters or images linked to other data sets, and
    when a predetermined object is selected by the cursor or the pointer and an operation of determining the selected object is performed, the means for erasing displays a window related to a data set linked to the object selected by the cursor or the pointer.

4. A method for display control, comprising:
    accepting selection of one of objects displayed on a screen in either a cursor mode in which a cursor is moved to select the object or a pointer mode in which a pointer is moved to select the same object, one of the modes being selected by a user; and
    when an instruction to switch the pointer mode to the cursor mode is given, erasing the pointer and displaying the cursor such that the cursor selects an object closest to a position where the pointer was displayed just before being erased,
    wherein after the pointer mode is selected, the pointer is movable over an entire screen area in response to user input and remains visible and stationary at any point on the entire screen when no user input is received,
    wherein the position where the pointer was displayed just before being erased due to the given instruction to switch the pointer mode to the cursor mode is a point where no object is displayed on the screen.

5. A computer readable storage medium storing computer readable instructions thereon which, when executed by a computer, cause the computer to perform a method comprising:
    accepting selection of one of objects displayed on a screen in either a cursor mode in which a cursor is moved to select the object or a pointer mode in which a pointer is moved to select the same object, one of the modes being selected by a user; and when an instruction to switch the pointer mode to the cursor mode is given, erasing the pointer and displaying the cursor such that the cursor selects an object closest to a position where the pointer was displayed just before being erased, wherein after the pointer mode is selected, the pointer is movable over an entire screen area in response to user input and remains visible and stationary at any point on the entire screen when no user input is received, wherein the position where the pointer was displayed just before being erased due to the given instruction to switch the pointer mode to the cursor mode is a point where no object is displayed on the screen.

6. A display control apparatus comprising:

circuitry configured to:

accept selection of one of objects displayed on a screen in either a cursor mode in which a cursor is moved to select the object or a pointer mode in which a pointer is moved to select the same object, one of the modes being selected by a user; and erase the pointer, when an instruction to switch the pointer mode to the cursor mode is given, and control display the cursor such that the cursor selects an object closest to a position where the pointer was displayed just before being erased, wherein after the pointer mode is selected, the pointer is movable over an entire screen area in response to user input and remains visible and stationary at any point on the entire screen when no user input is received, wherein the position where the pointer was displayed just before being erased due to the given instruction to switch the pointer mode to the cursor mode is a point where no object is displayed on the screen.

7. The apparatus according to claim 1, wherein when the pointer mode is selected and the means for erasing moves the pointer to the upper edge of the screen in response to user input, the means for erasing scrolls up the screen.

8. The apparatus according to claim 1, wherein when the pointer mode is selected and the means for erasing moves the pointer to a lower edge of the screen in response to user input, the means for erasing scrolls down the screen.

9. The apparatus according to claim 1, further comprising a remote control including a button that, when pressed and released, switches from a current mode being one of the cursor mode and the pointer mode to the other one of the cursor mode and the pointer mode.

\* \* \* \* \*